(12) United States Patent
Takano et al.

(10) Patent No.: US 7,225,788 B2
(45) Date of Patent: Jun. 5, 2007

(54) FUEL SUPPLY SYSTEM OF VEHICLE

(75) Inventors: Kiyohito Takano, Kobe (JP); Masaki Ito, Ono (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 11/134,255

(22) Filed: May 23, 2005

(65) Prior Publication Data

US 2005/0263140 A1 Dec. 1, 2005

(30) Foreign Application Priority Data

May 26, 2004 (JP) ............................. 2004-155920

(51) Int. Cl.
*F02B 77/08* (2006.01)
*F02D 17/04* (2006.01)

(52) U.S. Cl. ................................ 123/198 DB; 123/509

(58) Field of Classification Search ............... 123/509, 123/198 DB, DIG. 11, 511, 465, 457; 261/67
See application file for complete search history.

(56) References Cited

U.S. PATENT DOCUMENTS

| | | | | |
|---|---|---|---|---|
| 2,399,459 A | * | 4/1946 | Bouchez | ..................... 123/382 |
| 3,952,719 A | * | 4/1976 | Fenton et al. | ......... 123/198 DB |
| 4,159,701 A | * | 7/1979 | Murata | ....................... 123/324 |
| 4,957,084 A | * | 9/1990 | Kramer et al. | .............. 123/447 |
| 6,691,683 B2 | * | 2/2004 | Gracyalny et al. | .......... 123/516 |

FOREIGN PATENT DOCUMENTS

JP   A 2003-182672   7/2003

* cited by examiner

*Primary Examiner*—Mahmoud Gimie
(74) *Attorney, Agent, or Firm*—Oliff & Berridge, PLC.

(57) ABSTRACT

A fuel supply system of a vehicle is provided with a fuel tank 10 supported on a vehicle at a level equal to or lower than that of the carburetors 16 and 17 combined with an engine 5. A vacuum fuel cut valve 12 is placed on the upper surface of the fuel tank 10. A pulse-driven fuel pump 13 is disposed near the vacuum fuel cut valve 12 on the upper surface of the fuel tank 10. The vacuum fuel cut valve 12 has a fuel inlet port 36 connected to a fuel suction pipe 37, a fuel outlet pipe 28, and a vacuum chamber connected to an intake pipe 21*a* connected to the cylinder 21 of the engine 5. The pulse-driven fuel pump 13 is provided with a fuel suction pipe 25 connected to the fuel outlet pipe 28 of the vacuum fuel cut valve 12. When a negative pressure pulse is applied to the vacuum fuel cut valve 12, the vacuum fuel cut valve 12 opens to supply fuel to the carburetors 16 and 17.

5 Claims, 5 Drawing Sheets

FUEL SUPPLY SYSTEM OF VEHICLE

BACKGROUND OF THE INVENTION

1. Field of the Invention

The present invention relates to fuel supply system of a vehicle and, more particularly to a fuel supply system of vehicle including a fuel tank disposed at a level not higher than that of a carburetor combined with an engine.

2. Description of the Related Art

In a fuel supply system including a fuel tank disposed at a level higher than that of a carburetor to supply the fuel by the pressure head of the fuel contained in the fuel tank, it is usual to attach the fuel outlet line to the bottom wall of the fuel tank. The fuel outlet line is provided with a fuel cut valve to prevent the fuel contained in the fuel tank from flowing into the carburetor while the engine is stopped.

In a fuel supply system disclosed in Patent document 1 (JP-A 2003-182672) including a fuel tank disposed at a level not higher than that of a carburetor combined with an engine, it is usual to pump up the fuel contained in the fuel tank and to supply the fuel through a fuel supply line to the carburetor by a fuel pump. Since the fuel does not flow naturally from the fuel tank into the carburetor while the vehicle is stationary and the engine is stopped, the fuel supply line of the fuel supply system is not provided with any fuel cut valve.

Even in the fuel supply system including the fuel tank disposed at a level not higher than that of the carburetor, it is possible that the fuel contained in the fuel tank flows into the carburetor if the vehicle is shaken during transportation on a vehicle carrier or if the pressure in the fuel tank rises greatly due to temperature change. If the fuel flows accidentally into the carburetor, the fuel evaporated in the carburetor makes it difficult for the engine to start or the fuel is wasted. The fuel pump of the fuel supply system disclosed in Patent document 1 is disposed apart from the fuel tank. Therefore, it takes a long time for the fuel pump to pump up the fuel from the fuel tank when the engine is started, particularly, when the engine is started for the first time after shipping or after a long interruption of operation and, consequently, it takes a long time to start the engine.

SUMMARY OF THE INVENTION

Accordingly, it is an object of the present invention to provide a fuel supply system of a vehicle, capable of preventing the unnecessary flow of the fuel from a fuel tank to a carburetor even if a vehicle provided with the fuel supply system is shaken during transportation on a vehicle carrier or even if the pressure in the fuel tank changes.

Another object of the present invention is to provide a fuel supply system of a vehicle, capable of enabling an engine start easily and of facilitating the installation of a fuel cut valve and a fuel pump and maintenance work.

A fuel supply system of a vehicle according to the present invention a fuel tank includes a fuel tank disposed at a level substantially equal to or lower than that of a carburetor combined with an engine, the fuel supply system comprising: a vacuum fuel cut valve capable of being opened by negative pressure to supply fuel to the carburetor, the vacuum fuel cut valve being disposed on the upper surface of the fuel tank; a pulse-driven fuel pump driven by negative pressure pulse for supplying fuel to the carburetor from the fuel tank; and a fuel suction pipe for suctioning the fuel in the fuel tank and extending downward in the fuel tank; wherein the vacuum fuel cut valve has a vacuum chamber connected to a vacuum source in the engine for opening the vacuum fuel cut valve, and the pulse-driven fuel pump has a vacuum chamber connected to the vacuum source in the engine for driving the pulse-driven fuel pump.

In accordance with the fuel supply system of the vehicle, when a vehicle is shaken during transportation on a truck or the like with the engine stopped or when the pressure in the fuel tank rises due to temperature change, the flow of the fuel from the fuel tank to the carburetors can be prevented. Since the flow of the fuel can be cut near the fuel tank, the back flow of the fuel held in a part, between the vacuum fuel cut valve and the carburetor, of a fuel supply line into the fuel tank can be prevented and the fuel can be quickly supplied to the engine even if the engine is started for the first time after a long interruption of operation.

Further, the vacuum fuel cut valve is, opened by means of a vacuum source of the engine as a source of power. Thus, as compared with a use of a manual fuel cut valve, it is easier to start the engine. On the other hand, as compared with an automatic cut valve of an electric motor-driven type, a cost required for components can be more reduced.

The vacuum fuel cut valve is disposed on the upper surface of the fuel tank. Such a constitution simplifies an installation operation of the valve and also facilitates a maintenance operation thereof, as compared when the vacuum fuel cut valve is disposed on the side of the carburetor of the engine.

In the fuel supply system according to the present invention, the pulse-driven fuel pump driven is disposed near the vacuum fuel cut valve on the fuel tank, and a fuel inlet port of the pulse-driven fuel pump is connected to a fuel outlet of the vacuum fuel cut valve and a fuel inlet of the vacuum fuel cut valve is connected to the fuel suction pipe In the fuel supply system according to the present invention, the pulse-driven fuel pump driven by negative pressure pulses is disposed near the vacuum fuel cut valve on the fuel tank, and the pulse-driven fuel pump is provided between a fuel inlet of the vacuum fuel cut valve and the fuel suction pipe.

Since the fuel tank, the vacuum fuel cut valve and the pulse-driven fuel pump can be connected by short fuel supply lines, the pulse-driven fuel pump is able to pump up the fuel quickly when the engine is started for the first time after shipping or when the engine is started after a long interruption of operation, the fuel can be quickly supplied to the carburetors and hence the engine can be quickly started. The pulse-driven fuel pump driven by negative pressure pulses generated by the engine is inexpensive and lightweight as compared with an electric fuel pump.

Desirably, the pulse-driven fuel pump and the vacuum fuel cut valve are connected to different intake pipes serving as the vacuum sources and respectively connected to different cylinders, respectively Stable vacuums can be applied to the pulse-driven fuel pump and the vacuum fuel cut valve, respectively, without causing the vacuums interfere with each other. Consequently, the pulse-driven fuel pump is able to supply the fuel properly to the carburetor, and the insufficient opening of the vacuum fuel cut valve can be prevented.

Desirably, the pulse-driven fuel pump and the vacuum fuel cut valve are combined in a pump-and-valve unit, and the pump-and-valve unit is attached to the upper surface of the fuel tank.

The pump-and-valve unit attached to the upper surface of the fuel tank facilitates work for installing the pulse-driven fuel pump and the vacuum fuel cut valve and maintenance work.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
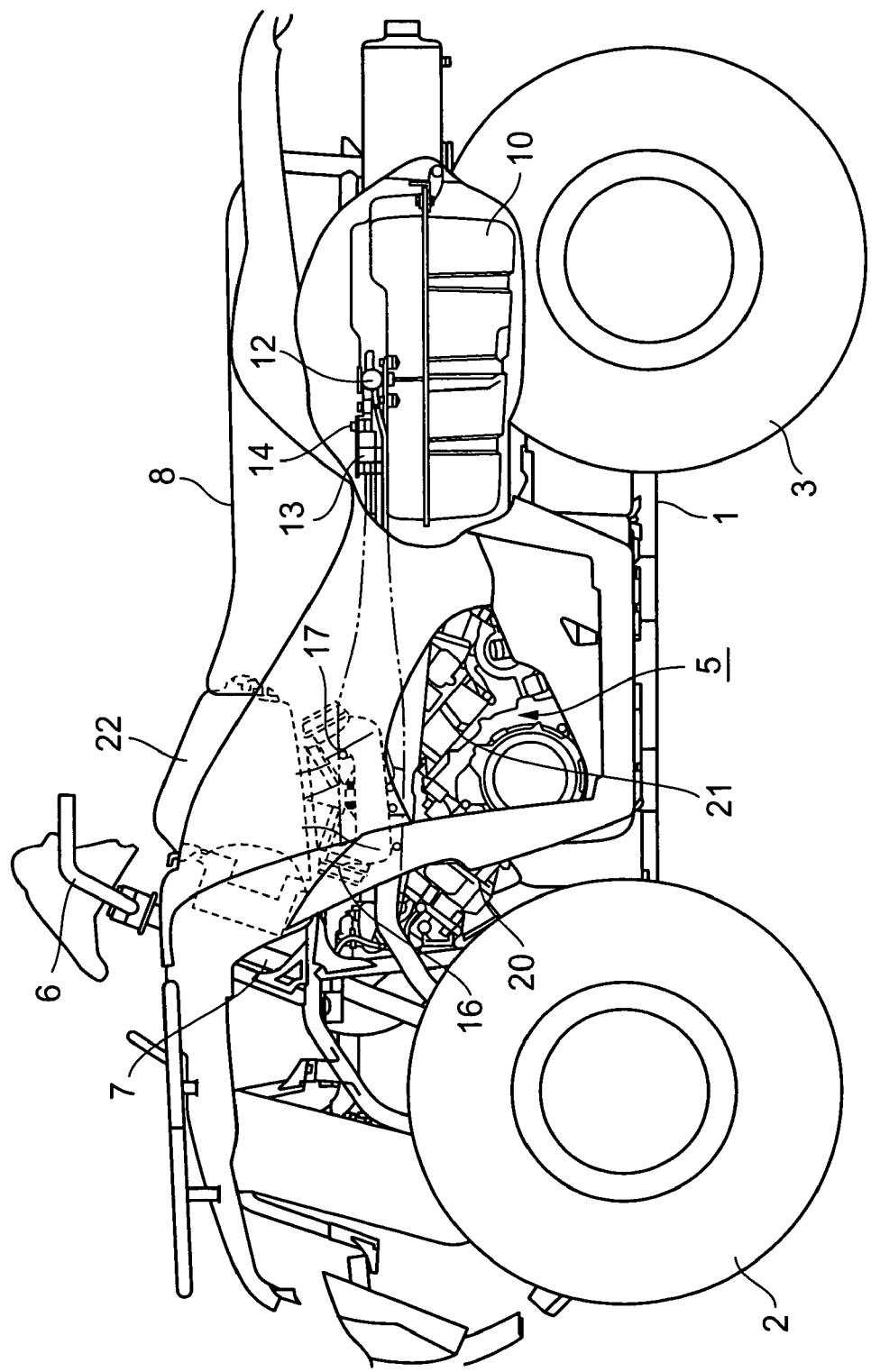
FIG. 1 is a partially cutout side elevation of an all-terrain straddle-type four-wheel vehicle provided with a fuel supply system in a preferred embodiment according to the present invention taken from the left side of the all-terrain straddle-type four-wheel vehicle.

FIGS. 1 to 6 show a fuel supply system in a preferred embodiment according to the present invention applied to an all-terrain straddle-type four-wheel vehicle. Referring to FIG. 1 showing an all-terrain straddle-type four-wheel vehicle (hereinafter, referred to simply as "vehicle") in a side elevation taken from the left side of the vehicle, right and left front wheels 2 and right and left rear wheels 3 are suspended from a front part and a rear part, respectively, of a body frame 1, and a V-2 engine 5 is supported on the body frame 1 in a space between the front wheels 2 and the rear wheels 3. A steering shaft 7 is disposed in front of the engine 5. A steering handlebar 6 is attached to the upper end of the steering shaft 7. A seat 8 is disposed at an elevated position behind the engine 5. The V-2 engine 5 has two cylinders 20 and 21 arranged in two banks set at an angle. Carburetors 16 and 17 respectively for the two cylinders 20 and 21 (that is, front cylinder 20 inclined forward and rear cylinder 21 inclined rearward) are placed between the two banks set in a V-shape. An air cleaner 22 is disposed above the carburetors 16 and 17. A fuel tank 10 is disposed under a rear half part of the seat 8. The fuel tank is attached to a body frame 1 such that the upper surface of the fuel tank 10 is at a level substantially equal to or lower than that of the carburetors 16 and 17.

A vacuum fuel cut valve (vacuum autotap) 12 is placed on the upper surface of the fuel tank 10. A pulse-driven fuel pump 13 is disposed in front of the vacuum fuel cut valve 12. The vacuum fuel cut valve 12 and the pulse-driven fuel pump 13 are connected in a single valve-and-pump unit by a connecting plate 14. The vacuum fuel cut valve 12 is fastened to the upper surface of the fuel tank 10.

Figure 2:
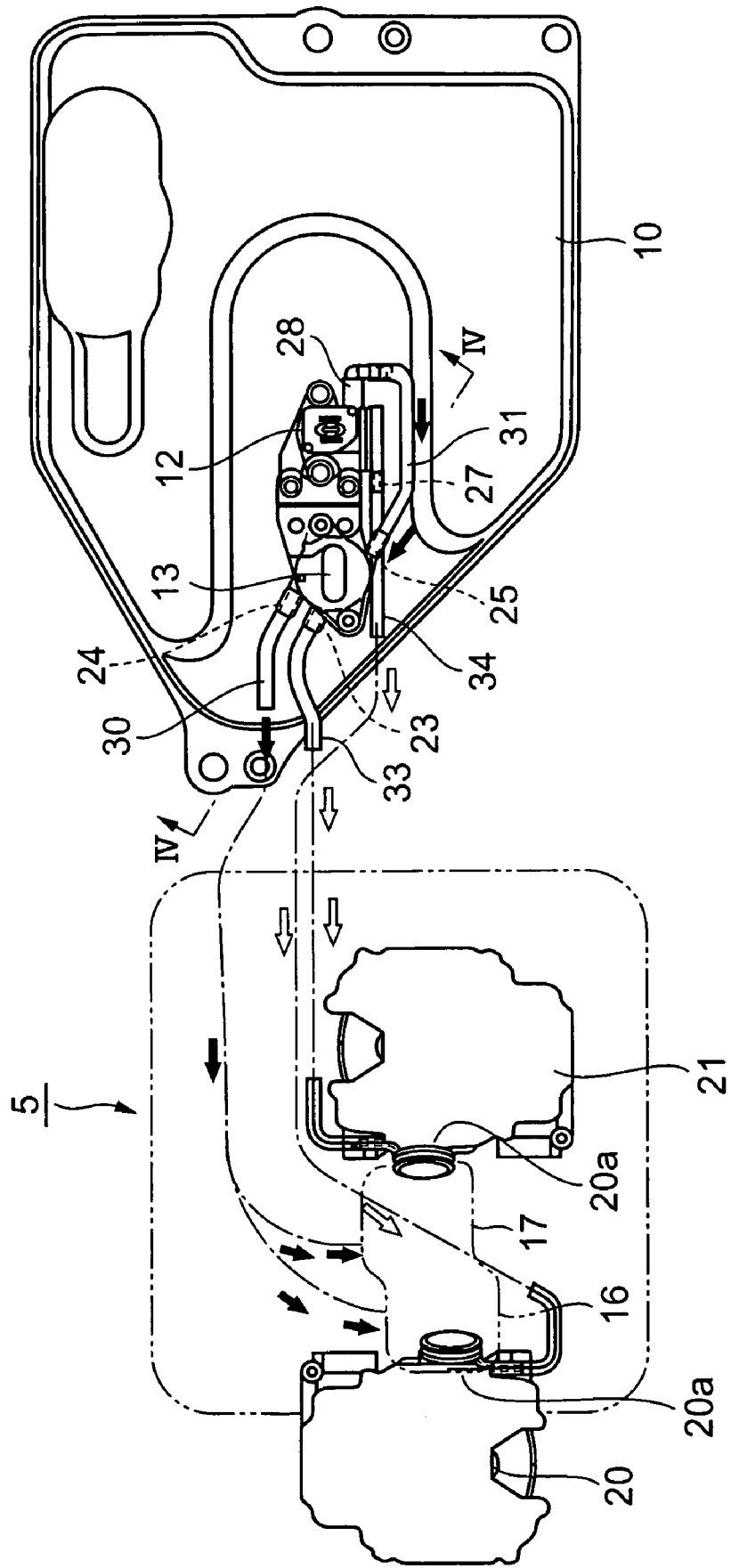
FIG. 2 is a schematic plan view of an engine and a fuel tank shown in FIG. 1.

Referring to FIG. 2 showing the engine 5 and the fuel tank 10 in a plan view, the pulse-driven fuel pump 13 is provided with a vacuum pipe 23, a fuel discharge pipe 24 and a fuel suction pipe 25. The vacuum pipe 23 and the fuel discharge pipe 24 are arranged side by side so as to project in a right-hand forward direction from the pulse-driven fuel pump 13. The fuel suction pipe 25 projects in a left-hand rearward direction from the pulse-driven fuel pump 13. The vacuum fuel cut valve 12 is provided with a suction pipe 27 and an L-shaped fuel outlet pipe 28. The suction pipe 27 projects forward from the left side surface of the vacuum fuel cut valve 12. The fuel outlet pipe 28 projects from the rear end surface of the vacuum fuel pump 12 and is bent so as to extend to the left. A fuel feed pipe 30 is connected to the fuel discharge pipe 24 of the pulse-driven fuel pump 13. The fuel feed pipe 13 is extended substantially horizontally forward and is connected to float chambers (fuel chambers) formed in the carburetors 16 and 17. A fuel pipe 31 is connected to the fuel suction pipe 25 of the pulse-driven fuel pump 13. The fuel pipe 31 is extended rearward and is connected to the fuel outlet port 28 of the vacuum fuel cut valve 12. A vacuum pipe 33 is connected to the suction pipe 23 of the pulse-driven fuel pump 13. The vacuum pipe 33 is extended forward and is connected to an intake pipe (vacuum source) 21a connected to the rear cylinder 21. A vacuum pipe 34 has one end connected to the suction pipe 27 of the vacuum fuel cut valve 12 and the other end connected to the intake pipe (vacuum source) 20a connected to the front cylinder 20.

Figure 3:
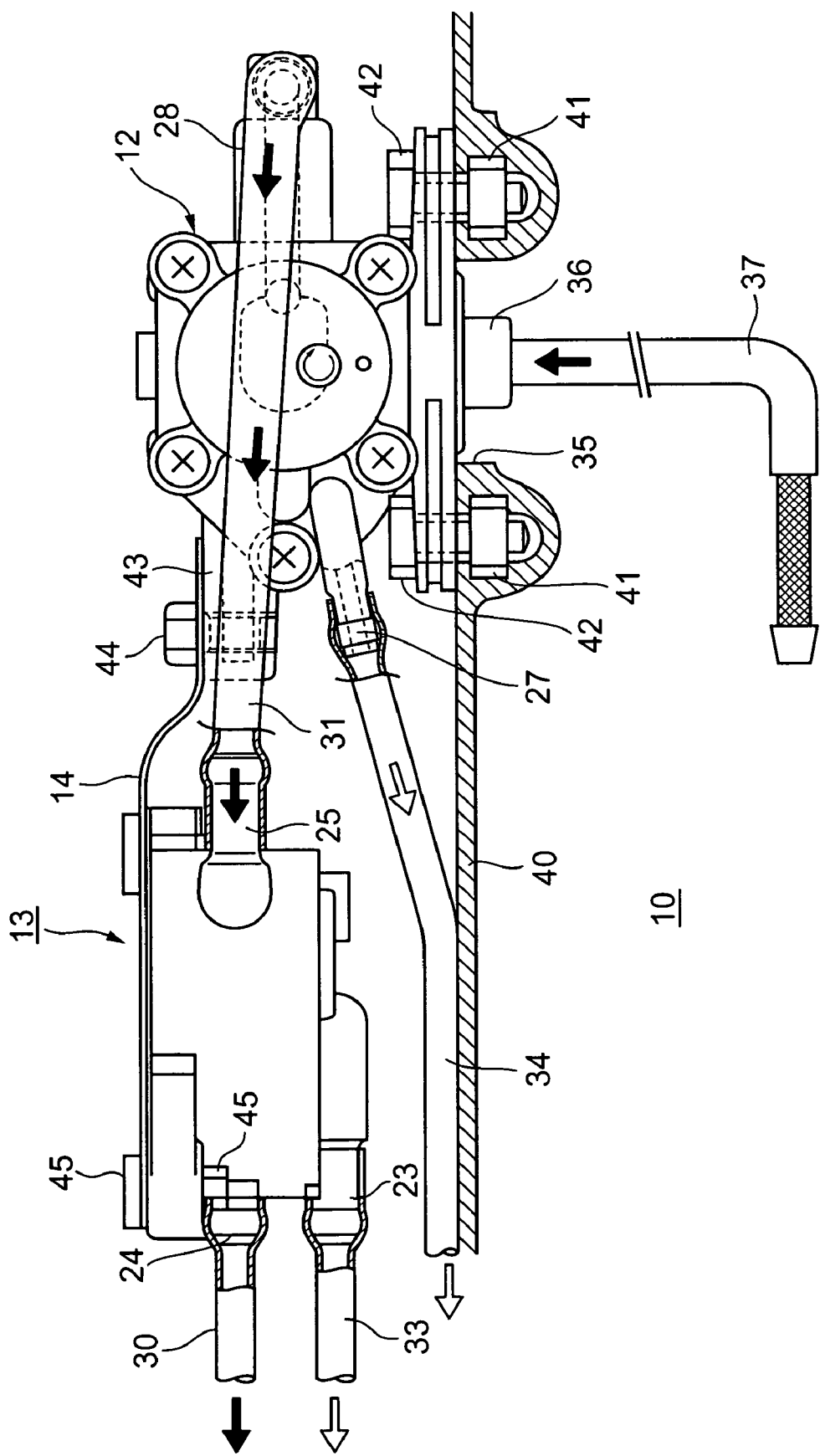
FIG. 3 is a partially cutout enlarged side elevation of a pulse-driven fuel pump and a vacuum fuel cut valve taken from the left side.

FIG. 3 shows the pulse-driven fuel pump 13 and the vacuum fuel cut valve 12 in an enlarged side elevation together with a part of a sectional view of the fuel tank 10. A fuel outlet 35 is formed in the upper wall 40 of the fuel tank 10. Nuts 41 are embedded in a part, surrounding the fuel outlet 35, of the upper wall 40 of the fuel tank 10. The vacuum fuel cut valve 12 is disposed so as to cover the fuel outlet 35 and is fastened to the fuel tank 10 by screwing bolts 42 in the nuts 41. The connecting plate 14 has a rear end part fastened to a bracket 43 formed on a front upper part of the vacuum fuel cut valve 12 with bolts 44, and a front end part fastened to the upper surface of the pulse-driven fuel pump 13 with bolts 45. A fuel suction pipe 37 is fitted in a fuel inlet port 36 formed in a lower end part of the vacuum fuel cut valve 12. The fuel suction pipe 37 has a vertical part extending downward in the fuel tank 10 and a horizontal part extending substantially horizontally near the bottom wall of the fuel tank 10.

Construction of Pulse-Driven Fuel Pump

Figure 4:
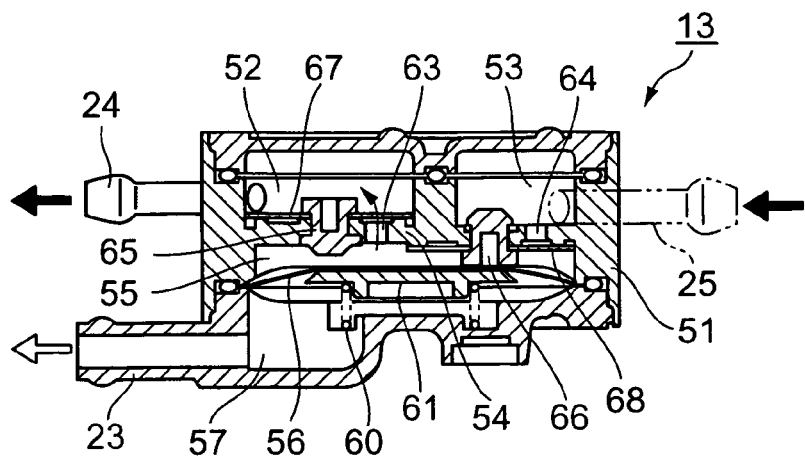
FIG. 4 is a sectional view of the pulse-driven fuel pump taken on the line IV—IV in FIG. 2.

Referring to FIG. 4 showing the pulse-driven fuel pump 13 in a sectional view taken on the line IV—IV in FIG. 2, a discharge chamber 52, a suction chamber 53, a diaphragm chamber 55 and a vacuum chamber (pressure pulse chamber) 57 are formed in a pump case 51. The diaphragm chamber 55 is formed under and is separated by a division wall 54 from the discharge chamber 52 and the suction chamber 53. The vacuum chamber 57 is formed under and is separated by a diaphragm 56 from diaphragm chamber 55. The fuel discharge pipe 24 opens into the discharge chamber 52. The fuel suction pipe 25 opens into the suction chamber 53. The vacuum pipe 23 opens into the vacuum chamber 57. A coil spring 60 applies a pressure to a movable member 61 to push the diaphragm 56 upward. A discharge valve hole 63 and a suction valve hole 64 are formed respectively in a first part, between the discharge chamber 52 and the diaphragm chamber 55, of the division wall 54 and a second part, between the suction chamber 53 and the diaphragm chamber 55, of the division wall 54. A flexible discharge reed valve element 67 and a flexible suction reed valve element 68 are placed on the upper surface of the first part of the division wall 54 facing the discharge chamber 52 and on the lower surface of the second part of the division wall 54 facing the diaphragm chamber 55 so as to cover the valve holes 63 and 64, respectively. The discharge reed valve element 67 and the suction reed valve element 68 are held on the division wall 54 by rubber rivets 65 and 66, respectively. The discharge reed valve element 67 is a member of a check valve for permitting the flow of the fuel only from the diaphragm chamber 55 into the discharge chamber 52. The suction reed valve element 58 is a member of a check valve for permitting the flow of the fuel only from the suction chamber 53 into the diaphragm chamber 55. When negative pressure more than a predetermined value is introduced into the vacuum chamber 57 from the intake pipe 21a serving as a vacuum source, the diaphragm 56 and the movable member 61 move downward against the resilience of the coil spring 60 to increase the volume of the diaphragm chamber 55. Consequently, the discharge reed valve element 67 closes the discharge valve hole 63, and the suction reed valve element 68 opens the suction valve hole 64 to permit the fuel to flow from the suction chamber 53 into the diaphragm chamber 55. When the negative pressure in the vacuum chamber 57 is released or a positive pressure is produced in the vacuum chamber 57, the diaphragm bulges upward as shown in FIG. 56 to decrease the volume of the diaphragm chamber 55. Consequently, the suction reed valve element 68 closes the suction valve hole 64 and the discharge reed valve element 67 opens the discharge valve hole 63 to permit the fuel to flow from the diaphragm chamber 55 through the discharge valve hole 63 into the discharge chamber 52.

Construction of Vacuum Fuel Cut Valve

Figure 5:
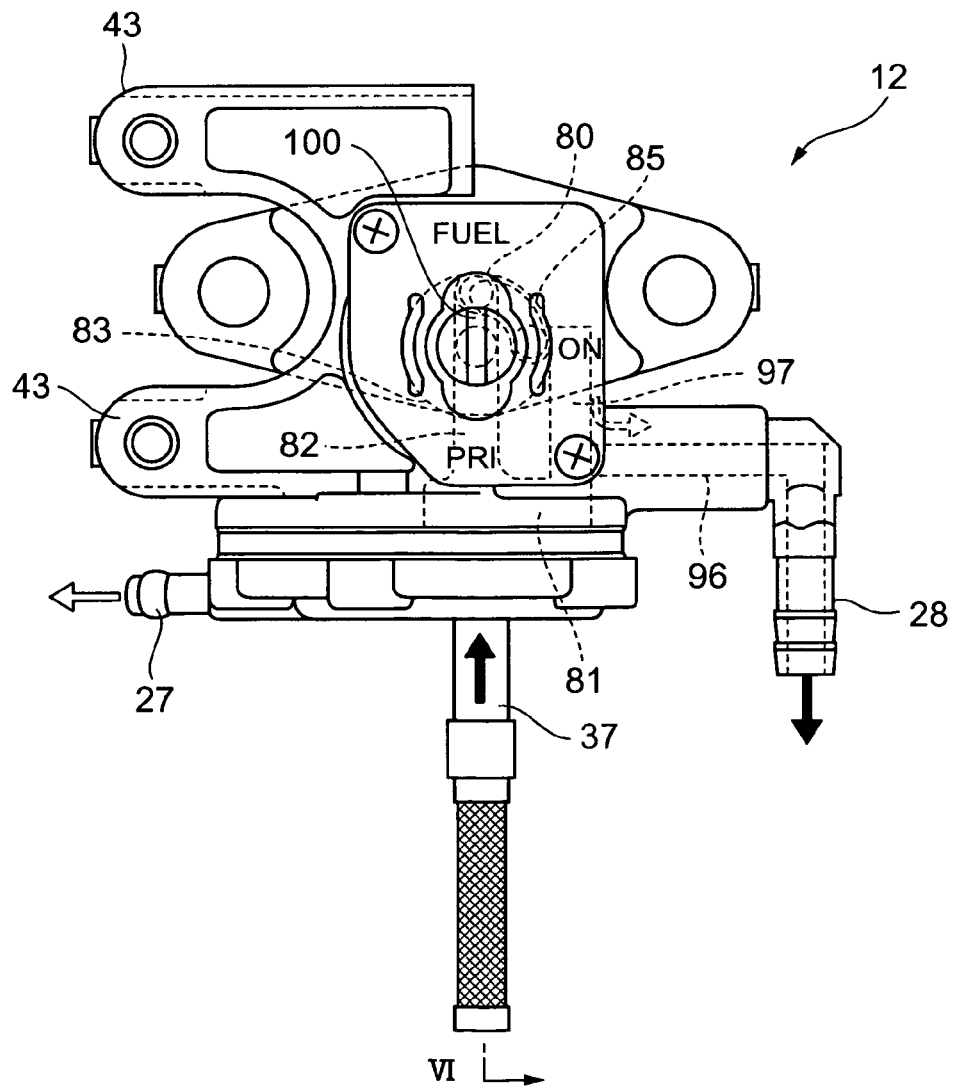
FIG. 5 is a side elevation of the vacuum fuel cut valve shown in FIG. 3 taken from the left side.
Figure 6:
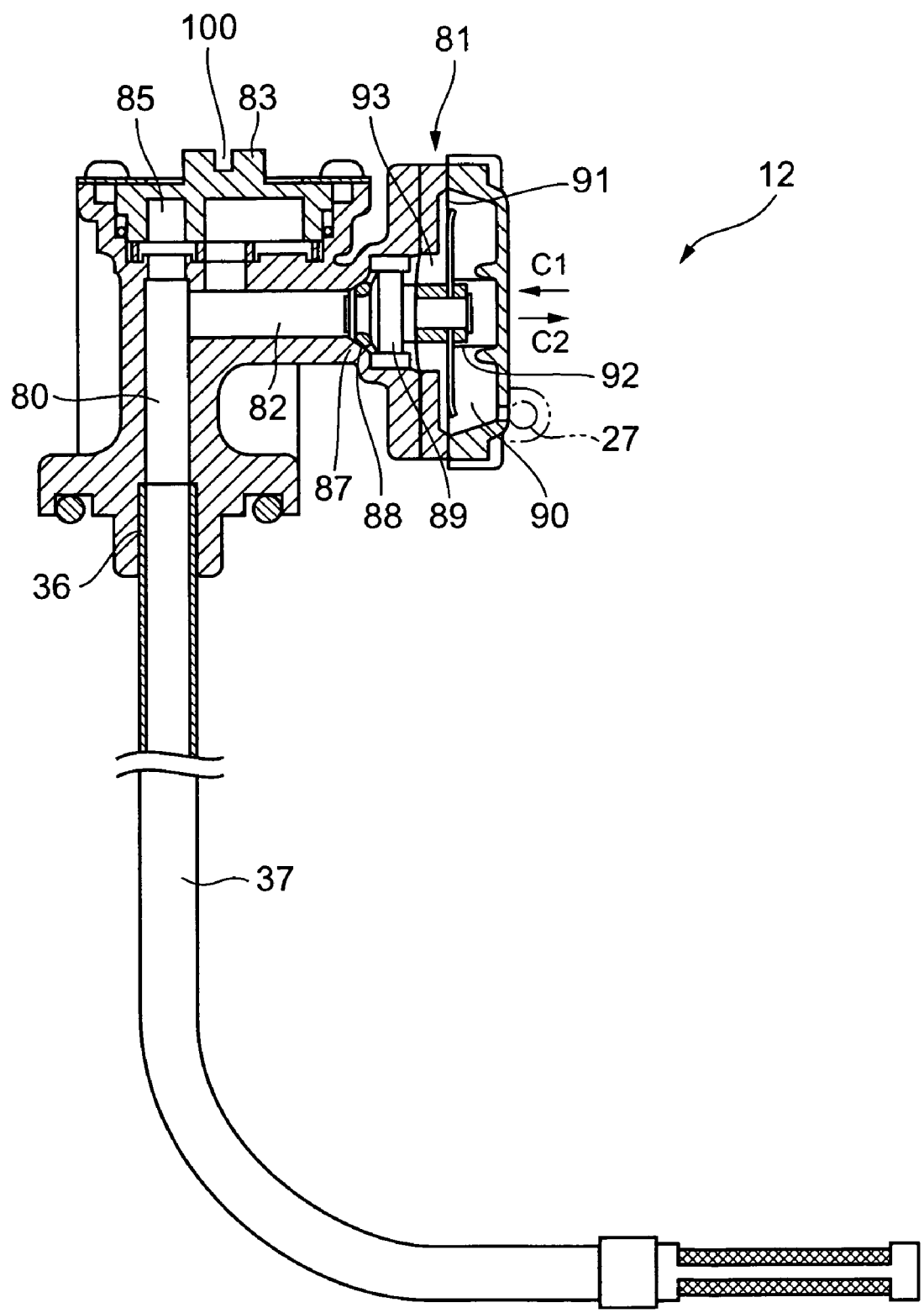
FIG. 6 is a sectional view of the vacuum fuel cut valve taken on the line VI—VI in FIG. 5.

Referring to FIG. 6 showing the vacuum fuel cut valve 12 in a longitudinal sectional view taken on the line VI-VI in FIG. 5, the vacuum fuel cut valve 12 is provided with a vertical suction passage 80 connected to the fuel inlet port 36 formed in the lower end part thereof, a vacuum valve mechanism 81 capable of being opened by a negative pressure, and a rotary selector valve element 83. The rotary selector valve element 83 is provided with a selection passage 85 having an open lower end. The upper end of the vertical suction passage 80 opens into the selection passage 85. A branch passage 82 branches off from the suction passage 80. The branch passage 82 is connected to the inlet of the vacuum valve mechanism 81.

The vacuum valve mechanism 81 has a valve seat 87 formed at an inlet part, an annular valve element 88 seated on the valve seat 87, a valve stem 89 capable of moving in the directions of the arrows C1 and C2 and connected to the valve element 88 to move the valve element 88 in a closing direction indicated by the arrow C1 and in an opening direction indicated by the arrow C2, a diaphragm 91 connected to the valve stem 89, and a coil spring 92 pushing the diaphragm 91 in the closing direction indicated by the arrow C1. A diaphragm chamber 93 and a vacuum chamber 90 are formed on the opposite sides of the diaphragm 91, respectively. The vacuum chamber 90 communicates with the suction pipe 27. The diaphragm chamber 93 communicates with the fuel outlet pipe 28 by means of an exit passage 96 shown in FIG. 5.

Referring to FIG. 5, a bypass passage 97 is connected to the exit passage 96. The selection passage 85 of the rotary selector valve element 83 has a quadrantlike shape. When the rotary selector valve element 83 is set at a primary position with a slot 100 aligned with a mark PRI, the suction passage 80 communicates with the by pass passage 97 by means of the selection passage 85 to enable the fuel to flow always from the suction passage 80 through the bypass passage 97 and the exit passage 96 into the fuel outlet pipe 28 whether the pressure in the vacuum chamber 90 is negative or not. When the rotary selector valve element 83 is turned counterclockwise through an angle of 90° from a position shown in FIG. 5 such that the slot 100 is aligned with a mark ON, the bypass passage 97 is closed and the fuel is able to flow from the suction passage 80 through the branch passage 82 only into the vacuum valve mechanism 81.

Next Operations of the fuel supply system will be described.

Operation During Transportation of Vehicle (1) The rotary selector valve element 83 of the vacuum fuel cut valve 12 shown in FIG. 5 is set so such that the slot 100 is aligned with the mark ON when the vehicle is shipped and is transported on a truck or the like to a place in the countryside or on a barren land to close the bypass passage 97.

(2) Since the engine of the vehicle is stopped during the transportation of the vehicle, any negative pressures are not applied to the vacuum fuel cut valve 12 and the pulse-driven fuel pump 13, the vacuum valve mechanism 81 is kept closed, and the pulse-driven fuel pump 13 shown in FIG. 3 is kept inoperative. Thus the vacuum fuel cut valve 12 cuts off the fuel by a predetermined cutoff pressure. Therefore, the fuel is never supplied to the carburetors 16 and 17 shown in FIG. 2 even if the fuel tank 10 is shaken and the fuel contained in the fuel tank 10 undulates or even if the pressure in the fuel tank 10 increases due to temperature rise.

Operation at First Operation of Engine after Shipping (1) When the engine is started for the first time after the shipping of the vehicle, the rotary selector valve element 83 of the vacuum fuel cut valve 12 is set so such that the slot 100 is aligned with the mark PRI. Consequently, the suction passage 80 is connected always through the selection passage 85, the by pass passage 97 and the exit passage 96 to the fuel outlet pipe 28.

(2) Referring to FIG. 2, when the engine is cranked, periodically pulsating negative pressures are generated in the intake pipes 20a and 21a respectively connected to the cylinders 20 and 21. Then, the pulsating negative pressure (negative pressure pulses) generated in the intake passage 20a of the front cylinder 20 is applied through the vacuum pipe 34 to the suction pipe 27 of the vacuum fuel cut valve 12 and the pulsating negative pressure (negative pressure pulses) generated in the intake passage 21a of the rear cylinder 21 is applied through the vacuum pipe 33 to the vacuum pipe 23 of the pulse-driven fuel pump 13.

(3) Referring to FIG. 4, when a negative-pressure pulse of the pulsating negative pressure is applied through the vacuum pipe 23 to the vacuum chamber 57 of the pulse-driven fuel pump 13, the diaphragm 56 is moved down against the resilience of the coil spring 60 and the volume of the diaphragm chamber 55 increases. Consequently, the fuel is sucked from the suction chamber 53 through the suction valve hole 64 into the diaphragm chamber 55.

(4) When a positive- or a 0-pressure pulse is applied to the vacuum chamber 57 of the pulse-driven fuel pump 13, the diaphragm 56 bulges upward and the volume of the diaphragm chamber 55 decreases. Consequently, the fuel is discharged from the diaphragm chamber 55 into the discharge chamber 52 and the fuel is supplied through the fuel feed pipe 30 to the carburetors 16 and 17.

(5) When the engine is started after a long interruption of operation, the rotary selector valve element 81 of the vacuum fuel cut valve 12 may be set so that the slot 100 is aligned with the mark PRI to supply the fuel quickly.

Normal Engine Starting (1) During normal engine starting, the rotary selector valve element 83 of the vacuum fuel cut valve 12 shown in FIG. 5 is set at the position where the slot 100 is aligned with the mark ON to ensure that the fuel flows through the vacuum valve mechanism 81 to the fuel outlet pipe 28.

(2) Referring to FIG. 2, periodically pulsating negative pressures are generated in the intake pipes 20a and 21a respectively connected to the cylinders 20 and 21 after the engine has been cranked for starting. The pulsating negative pressure (negative pressure pulses) generated in the intake pipe 20a connected to the front cylinder 20 is applied through the vacuum pipe 34 to the suction pipe 27 of the vacuum fuel cut valve 12. The pulsating negative pressure (negative pressure pulses) generated in the intake pipe 21a connected to the rear cylinder 21 is applied through the vacuum pipe 33 to the vacuum pipe 23 of the pulse-driven fuel pump 13.

(3) Referring to FIG. 6, the vacuum valve mechanism 81 is closed while the pressure in the vacuum chamber 90 of the vacuum fuel cut valve 12 is 0 or a positive pressure. The diaphragm 91 is pulled in the direction of the arrow C2 and the vacuum valve mechanism 81 opens when a negative pressure is applied to the vacuum chamber 90 of the vacuum fuel cut valve 12. Consequently, the fuel contained in the fuel tank 10 flows through the suction pipe 37, the fuel inlet port 36, the suction passage 80, the branch passage 82, the opened vacuum valve mechanism 81, the fuel outlet pipe 28 (FIG. 2) and the fuel pipe 31 to the fuel suction pipe 25 of the pulse-driven fuel pump 13.

(4) Referring to FIG. 4, the diaphragm 56 is pulled downward against the resilience of the coil spring 60 when a negative pressure is applied to the vacuum chamber 57 of the pulse-driven fuel pump 13. Consequently, the volume of the diaphragm chamber 55 increases, the suction valve hole 64 is opened, and the fuel supplied through the fuel suction pipe 25 into the suction chamber 53 flows through the suction valve hole 64 into the diaphragm chamber 52.

(5) The diaphragm 56 bulges upward when the pressure in the vacuum chamber 57 is 0 or a positive pressure. Consequently, the fuel contained in the diaphragm chamber 55 is discharged through the discharge valve hole 63 into the discharge chamber 52. Then, the fuel is fed through the fuel discharge pipe 24 (FIG. 2) and the fuel feed pipe 30 to the carburetors 16 and 17.

(6) The separate pulsating negative pressures generated in the intake pipes 20a and 21a connected to the cylinders 20 and 21 are applied to the vacuum fuel cut valve 12 and the pulse-driven fuel pump 13, respectively. Thus the vacuum fuel cut valve 12 and the pulse-driven fuel pump 13 can be drive by high negative pressures. Therefore, the vacuum fuel cut valve 12 is able to achieve a normal feed control operation and the pulse-driven fuel pump 13 is able to achieve a normal pumping operation even through the vacuum fuel cut valve 12 and the pulse-driven fuel pump 13 are disposed at long distances from the carburetors 16 and 17.

(7) The vacuum fuel cut valve 12 and the pulse-driven fuel pump 13 are disposed close to each other on the fuel tank 10. Therefore, the fuel contained in the fuel tank 10 can be quickly fed to the pulse-driven fuel pump 13 when the engine is started and the fuel can be fed to the carburetors 16 and 17 without delay.

Installation of Pulse-driven Fuel Pump and Vacuum Fuel Cut Valve

Referring to FIG. 3, the vacuum fuel cut valve 12 and the pulse-driven fuel pump 13 are connected beforehand by the connecting plate 14. The vacuum fuel cut valve 12 is fasted to the upper wall 4 of the fuel tank 10 with bolts. Since the pump-and-valve unit formed by connecting the vacuum fuel cut valve 12 and the pulse-driven fuel pump 13 by the connecting plate 14 is attached to the fuel tank 10, the vacuum fuel cut valve 12 and the pulse-driven fuel pump 13 can be readily removed from the fuel tank 10 for maintenance.

The fuel supply system of the present invention is applicable to straddle type vehicles including motorcycles in addition to the all-terrain straddle-type four-wheel vehicle.

The pulse-driven fuel pump is connected to the outlet side of the vacuum fuel cut valve as shown in FIGS. 2 and 3 in the foregoing embodiment. The pulse-driven fuel pump may be connected to the inlet side of the vacuum fuel cut valve. When the pulse-driven fuel pump and the vacuum fuel cut valve are thus connected, the fuel contained in the fuel tank flows through the suction pipe, the pulse-driven fuel pump and the vacuum fuel cut valve in that order and is fed to the carburetors of the engine.

Negative pressure generated in the crankcase of the engine can be used as a vacuum source.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A fuel supply system of a vehicle including a fuel tank disposed at a level substantially lower than that of a carburetor combined with an engine, the fuel supply system comprising:

a vacuum fuel cut valve capable of being opened by negative pressure to supply fuel to the carburetor, the vacuum fuel cut valve being disposed on an upper surface of the fuel tank;

a pulse-driven fuel pump driven by negative pressure pulse for supplying fuel to the carburetor from the fuel tank, the pulse-driven fuel pump being disposed on the upper surface of the fuel tank; and a fuel suction pipe for suctioning the fuel in an upward direction from the fuel tank, the fuel suction pipe extending from the upper surface of the fuel tank downward in the fuel tank, wherein the vacuum fuel cut valve has a vacuum chamber connected to a vacuum source in the engine for opening the vacuum fuel cut valve, and the pulse-driven fuel pump has a vacuum chamber connected to the vacuum source in the engine for driving the pulse-driven fuel pump.

2. The fuel supply system according to claim 1, wherein the pulse-driven fuel pump is disposed adjacent to the vacuum fuel cut valve on the fuel tank, and a fuel inlet port of the pulse-driven fuel pump is connected to a fuel outlet of the vacuum fuel cut valve and a fuel inlet of the vacuum fuel cut valve is connected to the fuel suction pipe.

3. The fuel supply system according to claim 1, wherein the pulse-driven fuel pump and the vacuum fuel cut valve are connected to different intake pipes serving as the vacuum source, the different intake pipes respectively connected to different cylinders.

4. The fuel supply system according to claim 2, wherein the pulse-driven fuel pump and the vacuum fuel cut valve are combined by a connecting plate to form a pump-and-valve unit, and the pulse-driven fuel pump is attached to the upper surface of the fuel tank through the connecting plate and the vacuum fuel cut valve.

5. The fuel supply system according to claim 1, wherein the vacuum fuel cut valve is provided with a vacuum valve mechanism capable of being opened by the negative pressure and fluidly connecting the fuel inlet of the vacuum fuel cut valve and the fuel outlet of the vacuum fuel cut valve, a bypass passage for bypassing the vacuum valve mechanism and connecting directly the fuel inlet of the vacuum fuel cut valve and the fuel outlet of the vacuum fuel cut valve, and a selector valve element for selecting the bypass passage.

* * * * *